(12) United States Patent
Suh et al.

(10) Patent No.: US 9,045,349 B2
(45) Date of Patent: Jun. 2, 2015

(54) METHOD FOR PREPARING POROUS ALUMINA

(75) Inventors: Jeong Kwon Suh, Daejeon (KR); Beom Sik Kim, Daejeon (KR); You In Park, Daejeon (KR); Hong Chan Ahn, Daejeon (KR); Yun Ho Jeong, Daejeon (KR); Byung Ki Park, Daejeon (KR); Hak Jun Kim, Daejeon (KR); Jong An Kim, Daejeon (KR); Ji Sook Hong, Chungcheongbuk-do (KR); Won Young Lee, Daejeon (KR); Hyo Sang Yun, Seongnam-si (KR)

(73) Assignees: KOREA RESEARCH INSTITUTE OF CHEMICAL TECHNOLOGY, Daejeon (KR); ZEOBUILDER CO., LTD., Seoul (KR)

( * ) Notice: Subject to any disclaimer, the term of this patent is extended or adjusted under 35 U.S.C. 154(b) by 0 days.

(21) Appl. No.: 14/232,987

(22) PCT Filed: Jul. 12, 2012

(86) PCT No.: PCT/KR2012/005524
§ 371 (c)(1),
(2), (4) Date: Jan. 15, 2014

(87) PCT Pub. No.: WO2013/012201
PCT Pub. Date: Jan. 24, 2013

(65) Prior Publication Data
US 2014/0161716 A1 Jun. 12, 2014

(30) Foreign Application Priority Data

Jul. 15, 2011 (KR) .................. 10-2011-0070552

(51) Int. Cl.
| | |
|---|---|
| C01F 7/00 | (2006.01) |
| C01F 7/30 | (2006.01) |
| B01J 21/04 | (2006.01) |
| B01J 37/10 | (2006.01) |
| B01J 20/08 | (2006.01) |
| B01J 20/28 | (2006.01) |
| C01F 7/34 | (2006.01) |
| C01F 7/44 | (2006.01) |
| B82Y 30/00 | (2011.01) |
| B01J 37/03 | (2006.01) |
| B01J 35/10 | (2006.01) |
| B01J 37/00 | (2006.01) |

(52) U.S. Cl.
CPC . *C01F 7/30* (2013.01); *B01J 21/04* (2013.01); *B01J 37/036* (2013.01); *B01J 37/10* (2013.01); *B01J 35/1019* (2013.01); *B01J 35/1042* (2013.01); *B01J 35/1047* (2013.01); *B01J 37/0009* (2013.01); *B01J 20/08* (2013.01); *B01J 20/28076* (2013.01); *B01J 20/28004* (2013.01); *C01F 7/34* (2013.01); *C01F 7/448* (2013.01); *C01P 2002/60* (2013.01); *C01P 2004/04* (2013.01); *C01P 2004/52* (2013.01); *C01P 2004/64* (2013.01); *C01P 2006/14* (2013.01); *B82Y 30/00* (2013.01); *B01J 35/1061* (2013.01)

(58) Field of Classification Search
None
See application file for complete search history.

(56) References Cited

U.S. PATENT DOCUMENTS

| | | | | |
|---|---|---|---|---|
| 3,630,670 | A | * 12/1971 | Bell et al. | 423/626 |
| 4,595,581 | A | 6/1986 | Misra et al. | |
| 4,865,825 | A | 9/1989 | Chantriaux et al. | |
| 6,048,470 | A | 4/2000 | Nakahara et al. | |
| 6,174,511 | B1 * | 1/2001 | Tsukada et al. | 423/628 |
| 7,442,361 | B1 | 10/2008 | Gloeckler et al. | |

FOREIGN PATENT DOCUMENTS

| | | |
|---|---|---|
| EP | 0934905 B1 | 8/1999 |
| JP | 5319000 | 6/1978 |
| JP | 58190823 | 11/1983 |
| JP | 61215213 A | 9/1986 |
| JP | 2003313027 | 11/2003 |
| KR | 1020000068567 A | 11/2000 |

OTHER PUBLICATIONS

International Preliminary Report on Patentability for application PCT/KR2012/005524 dated Jan. 30, 2014, citing the above reference(s).
International Search Report mailed Jan. 22, 2013 for PCT/KR2012/005524, citing the above reference(s).

* cited by examiner

*Primary Examiner* — Steven Bos
(74) *Attorney, Agent, or Firm* — Lowe Hauptman & Ham, LLP

(57) ABSTRACT

The present invention relates to a method for preparing a porous alumina which may be suitably used as a catalyst carrier, an adsorbent, and various surface coating agents and has a boehmite or pseudoboehmite structure having a fine and uniform particle size distribution and a large pore volume.

8 Claims, 5 Drawing Sheets

METHOD FOR PREPARING POROUS ALUMINA

CROSS REFERENCE TO RELATED APPLICATION

This application claims the priority of Korean Patent Application No. 10-2011-0070552, filed on Jul. 15, 2011 in the KIPO (Korean Intellectual Property Office). Further, this application is the National Phase application of International Application No. PCT/KR2012/005524 filed Jul. 12, 2012, which designates the United States and was published in Chinese.

TECHNICAL FIELD

The present invention relates to a method for preparing a porous alumina which may be suitably used as a catalyst carrier, an adsorbent, and various surface coating agents and has a boehmite or pseudoboehmite structure having a fine and uniform particle size distribution and a large pore volume.

BACKGROUND ART

Alumina is chemically stable and has a high melting point and excellent physical properties such as electrical insulation, mechanical strength and hardness, and is thus widely used in various industrial fields such as refractories, abrasives and high-speed cutting tools. In particular, highly porous alumina is industrially and widely used in catalyst supports, adsorbents and various surface coating agents, and a range of required properties, such as a pore volume, a pore size, a pore size distribution, and a specific surface area, vary depending on the purpose of use thereof. Recently, due to trends of diversification of industries, a demand for highly porous alumina having a large pore volume is increasing. Crystalline alumina as gibbsite, bayerite and boehmite may be prepared according to the method of preparing alumina, or amorphous alumina may be prepared. Among them, a boehmite or pseudoboehmite structure is known as the most preferred structure to control the pores thereof. Accordingly, studies on the method of preparing a porous alumina having a boehmite or pseudoboehmite structure have been performed from many different perspectives.

Currently known methods of preparing a porous alumina having a boehmite or pseudoboehmite structure are as follows.

U.S. Pat. No. 7,442,361 discloses that alumina having a boehmite or pseudoboehmite structure is prepared by performing a method of using crystal seeds having an average diameter from 20 nm to 150 nm and a precipitant such as an alkali metal or aluminum sulfate, and adjusting the pH from 6 to 8. In U.S. Pat. No. 7,442,361, different crystal seeds are applied depending on the properties required for alumina, and thus the process needs to undergo a change. That is, the limitation of raw materials and the resultant diversification of process facilities follow.

Further, Japanese Patent Application Publication No. 2003-313027 discloses a method of preparing a boehmite sol, the method including: obtaining an alumina hydrate slurry in a batch-type manner by slowly adding a sodium aluminate solution to an aluminum chloride solution at room temperature until the pH becomes 10 or more, preparing a boehmite slurry by hydrothermally synthesizing the alumina hydrate slurry, filtering and washing the boehmite slurry, and then peptizing the alumina hydrate slurry by using a nitric acid aqueous solution such that the pH becomes 4. In Japanese Patent Application Publication No. 2003-313027, the uniformity of a product deteriorates because a batch-type processing process is performed while the pH is adjusted to 10 or more, and there is a problem in process facilities and process safety because a strong acid is used in the peptization process.

In addition, U.S. Pat. No. 6,048,470 discloses a method for producing an alumina sol, the method including: stirring a dispersion of an alumina hydrate having a solid content of from 1 wt % to 40 wt % at a pH of from 7 to 12 with an effective consumptive power of 0.5 kW/m or more for aggregation treatment, and then adding an acid thereto for peptization. U.S. Pat. No. 6,048,470 includes the contents of controlling the pH of a dispersion of an alumina hydrate to a predetermined range by using an alkali metal hydroxide, and includes a process of obtaining alumina having small particles by repeating eight times a step of adjusting the pH to 3.5 by using an aluminum nitrate solution having a concentration of 5 wt % and adjusting the pH to 9.5 again by using a sodium aluminate solution. Therefore, U.S. Pat. No. 6,048,470 has the complexity of a process in which the pH adjustment process is repeated, and thus has low economic efficiency for commercialization.

Furthermore, European Patent No. 0934905 discloses a method of preparing alumina having a boehmite structure, the method including: a process of dispersing an alumina hydrate in an acidic solution having a pH from about 3 to about 4, and then controlling the pH from 10 to 11 by using an alkali reagent, a process of obtaining a colloidal sol by aging the dispersion at a temperature of 80° C. or more for at least 4 hours or more, and adjusting the pH to 8 by using an acidic reagent, and a process of peptizing the colloidal sol. In European Patent No. 0934905, an aging process is performed as a means for controlling the pore size, volume and surface area of alumina, and the process time becomes long as it takes 35 hours for the aging, and therefore, there is a problem of a reduction in productivity and an increase in process costs. As an invention which discloses a similar aging method, Japanese Patent Application Publication No. Sho 53-19000 discloses a method of growing an amorphous alumina hydrate to an alumina having a pseudoboehmite structure with a pore volume more than 0.6 mL/g and an average pore size of 600 Å or less by aging the amorphous alumina hydrate at a pH from 8 to 12 and a temperature of 50° C. or more. Japanese Patent Application Publication No. Sho 53-19000 has a problem in that productivity is reduced by an aging process at a low temperature for a long time.

Further, Japanese Patent Application Publication No. Sho 58-190823 discloses a method of forming an alumina gel by adding a pH adjusting agent and an aluminum salt solution to an aluminum hydroxide-containing slurry at a predetermined rate while maintaining a pH from 6 to 11 and a temperature of 50° C. or more, and converting the prepared alumina gel into an alumina having a boehmite structure. Japanese Patent Application Publication No. Sho 58-190823 has a problem in that it is difficult to stably produce an alumina having a uniform particle size distribution because a precipitate of alumina hydrate is produced in the aluminum hydroxide-containing slurry so that that the mixture state of the entire reactant is not uniform, and the composition of the prepared alumina product is also non-uniform.

As described above, studies on a method for preparing an alumina having a boehmite or pseudoboehmite structure have been performed from many different perspectives, but still have limitations for commercial use.

DETAILED DESCRIPTION OF THE INVENTION

Technical Problem

An object of the present invention is to provide an improved method for preparing a porous alumina which has a boehmite or pseudoboehmite structure having a fine and uniform particle size distribution and a large pore volume.

Technical Solution

In order to solve the problem, the present invention provides a method for preparing a porous alumina, including:
simultaneously injecting a sodium aluminate solution and a nitric acid or polyaluminumchloride solution into a continuous-flow mixer at a predetermined flow rate using a metering pump while maintaining a constant temperature in a temperature range from 20° C. to 95° C., and forming a hydrogel simultaneously while a pH is neutralized from 9 to 10 by bringing the sodium aluminate solution in contact with the nitric acid or polyaluminumchloride solution in the mixer;
converting the hydrogel formed in the mixer into a colloidal sol by allowing the hydrogel to reside in the mixer for 5 seconds to 20 seconds while subjecting the hydrogel to torque; and
preparing a porous alumina having a boehmite or pseudoboehmite structure by introducing the colloidal sol into a hydrothermal synthesis reactor and crystallizing the colloidal sol at a temperature from 90° C. to 150° C.

Advantageous Effects

The present invention has an effect in that it is possible to prepare a porous alumina having a low incorporation of grit (granular solidified material) and excellent fluidity by simultaneously injecting an alkali solution of sodium aluminate and an acidic solution of nitric acid or polyaluminumchloride using a continuous-flow mixing method, forming a hydrogel by an instantaneous neutralization reaction, and converting the hydrogel into a colloidal sol for a short residence time, as compared to a hydrogel prepared by a batch-type method in the related art.

In addition, the present invention has an effect in that it is possible to commercially prepare a porous alumina which has a boehmite or pseudoboehmite structure having a fine and uniform particle size distribution.

BEST MODE

Figure 1:
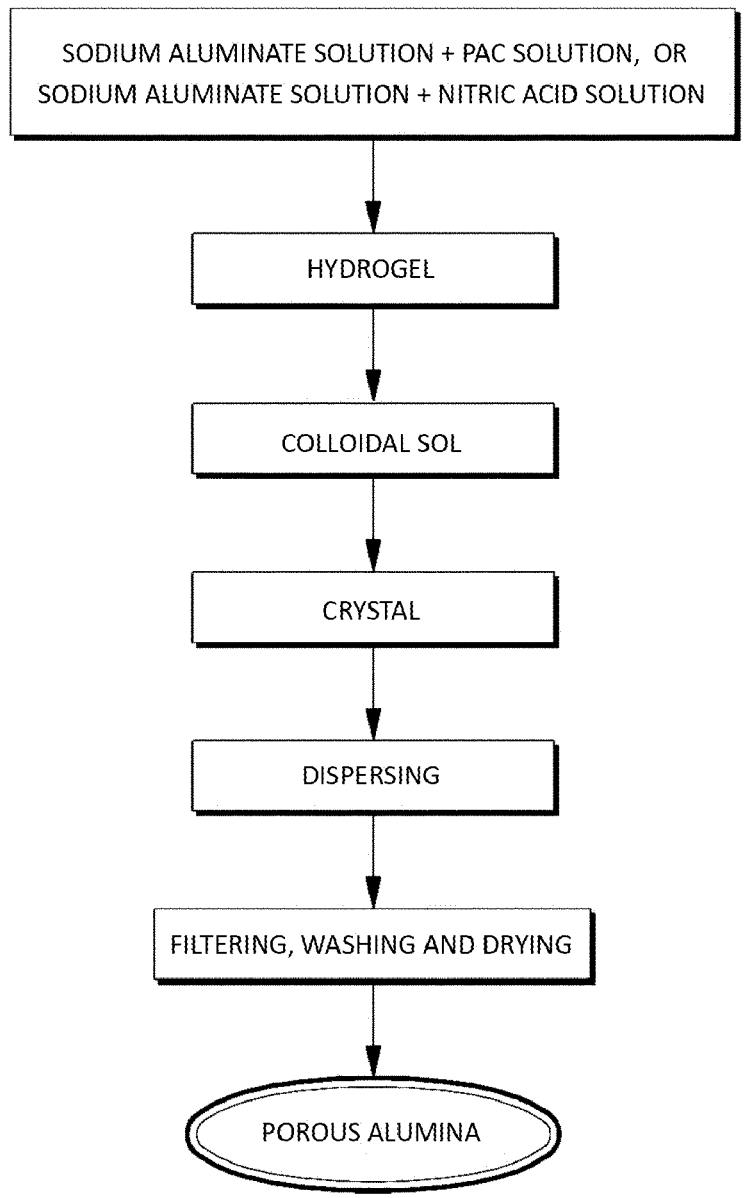
FIG. 1 is a flowchart of a process of preparing a porous alumina.

As illustrated in the process flowchart in FIG. 1, the method for preparing a porous alumina according to the present invention includes: a process of forming a hydrogel by using an alkali solution of sodium aluminate and an acidic solution of nitric acid or polyaluminumchloride as raw materials; a process of converting the hydrogel into a colloidal sol; a process of crystallizing the colloidal sol; and a process of collecting the produced crystal by subjecting the produced crystal to a series of post-treatments including dispersion, filtration, washing and drying.

The aforementioned method for preparing a porous alumina according to the present invention will be described in more detail for each process as follows.

First, a hydrogel is prepared by a neutralization reaction of an alkali solution of sodium aluminate and an acidic solution of nitric acid or polyaluminumchloride.

The sodium aluminate solution is prepared by adding a caustic soda solution and water to aluminum hydroxide and dissolving the mixture at 100° C. to 150° C., as represented in the following Reaction Scheme 1.

[Reaction Scheme 1]

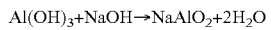

$$Al(OH)_3 + NaOH \rightarrow NaAlO_2 + 2H_2O$$

The sodium aluminate solution used as an alkali solution in the present invention may be prepared in a concentration range from 10 wt % to 30 wt % and used. In addition, the nitric acid solution and the polyaluminumchloride solution used as an acidic solution in the present invention may be prepared in a concentration range from 10 wt % to 30 wt % and from 5 wt % to 20 wt %, respectively, and used.

Furthermore, the hydrogel is prepared by reacting the alkali solution prepared with the acidic solution. The following Reaction Scheme 2(1) is a Reaction Scheme showing a reaction of the sodium aluminate solution and the nitric acid solution, and Reaction Scheme 2(2) is a Reaction Scheme showing a reaction of the sodium aluminate solution and the polyaluminumchloride (PAC) solution.

[Reaction Scheme 2]

$$NaAlO_2 + HNO_3 \rightarrow AlO(OH) + NaNO_3 \quad (1)$$

$$3NaAlO_2 + AlCl_3 + 2H_2O \rightarrow 4AlO(OH) + 3NaCl \quad (2)$$

In the present invention, a neutralization reaction is performed by an instantaneous contact by adopting a method of simultaneously injecting an alkali solution and an acidic solution into a continuous-flow mixer, thereby preparing a hydrogel which has uniform physical properties and a uniform particle size. When an acidic solution is injected into an alkali solution or an alkali solution is injected into an acidic solution by a batch-type mixing method in the related art, uniform mixing is not substantially achieved because conditions of the initial to end stages of the reaction are not constantly maintained, and as a result, the physical properties and particle size of the hydrogel prepared are not uniform. However, since an alkali solution and an acidic solution are simultaneously injected at a predetermined rate by a continuous-flow mixing method in the present invention, conditions of the initial to end stages of the reaction are almost constantly maintained and uniform mixing is enabled. Further, in the process of preparing a hydrogel by the continuous-flow mixing method according to the present invention, the injection temperature and injection rate of the raw material solution, and pH conditions during the formation of the gel also act as major factors which control the physical properties and particle size of the hydrogel.

Preferably, the hydrogel reaction proceeds while maintaining the alkali solution and the acidic solution as raw materials at a constant temperature in a temperature range from 20° C. to 95° C., preferably from 40° C. to 70° C., simultaneously injecting the alkali solution and the acidic solution into a continuous-flow mixer at a predetermined flow rate through a metering pump, and constantly maintaining the pH of the reactants in the mixer to a range from 9.0 to 10.0 by controlling the flow rates of the alkali solution and the acidic solution. It is preferred that the continuous process is performed by maintaining the viscosity of the reactants in a range from approximately 6,500 cp to approximately 18,200 cp while the hydrogel is produced.

In the aforementioned process of producing the hydrogel, the lower the temperature of the raw material solution is, the longer the time for the hydrogel reaction tends to become. When the temperature is maintained at an excessively low level, a hydrogel having a non-uniform size is formed because the time for the gelation reaction becomes too long, whereas when the temperature is maintained at an excessively high level, a hydrogel having high viscosity is formed because the time for the gelation reaction becomes too short. In addition, the crystal form of alumina prepared may vary depending on the pH conditions of the reactant in which the gelation reaction proceeds, and in the present invention, an alumina having a boehmite or pseudoboehmite structure may be prepared by performing the hydrogel reaction while constantly maintaining the pH in a range from 9.0 to 10.0. That is, since the pH of the reactant which forms the hydrogel is changed by relatively controlling the flow rates of the alkali solution and the acidic solution in the continuous-flow mixing method, the flow rate of each of the raw material solutions is controlled such that the pH of the reactants is maintained in a range from 9.0 to 10.0 for preparing an alumina having a boehmite or pseudoboehmite structure, but once the flow rate is determined, a hydrogel having uniform physical properties and particle size is formed by constantly maintaining the flow rate to maintain the same reaction conditions from the initial stage of the reaction to the end stage of the reaction.

Next, the hydrogel prepared in the above is converted into a colloidal sol.

Since the viscosity of the reaction solution is sharply increased and a solidification and aggregation phenomenon occurs while the hydrogel is formed, it is not easy to convert the hydrogel gel into a colloidal sol. Thus, in the present invention, the hydrogel is converted into a colloidal sol by allowing the hydrogel to reside in the mixer for a short time while subjecting the hydrogel to torque prior to an increase in viscosity or occurrence of solidification and aggregation. This process is enabled by using a continuous-flow mixer.

Preferably, the hydrogel is formed by an instantaneous contact between the alkali solution and the acidic solution which are simultaneously injected into the continuous-flow mixer, and is converted into a colloidal sol by allowing the hydrogel to reside in the mixer for a short time of 5 seconds to 20 seconds while subjecting the hydrogel to torque using a screw type kneader mounted in the mixer. When the residence time in the continuous-flow mixer is too short, the conversion ratio into the colloidal sol is low, which is not preferred, and when the residence time is too long, the hydrogel is completely gelled to cause a sharp increase in viscosity and a solidification and aggregation phenomenon so that an exit of the mixer is clogged, thereby making it difficult to perform a continuous process. Therefore, it may act as an important factor to control an appropriate residence time in forming a hydrogel which affects physical properties of a final product.

Furthermore, in order to achieve conversion into a colloidal sol more efficiently, the size of the mixer and the rotation speed of the screw-type kneader may also act as important factors, in addition to the residence time in the continuous-flow mixer. In the Examples of the present invention, there is used a continuous-flow mixer which has a ratio of length: diameter of 1:0.02 to 0.35 and is equipped with a double screw type kneader having the number of rotations per minute in a range from 10 to 600. According to the size of the mixer or the rotation speed of the kneader, the residence time may also be appropriately controlled within the aforementioned range. The colloidal sol discharged through a lower end portion of the continuous-flow mixer after being subjected to the aforementioned residence step has a viscosity in a range from 300 cp to 1,800 cp.

Next, a porous alumina having a boehmite or pseudoboehmite structure is prepared by performing crystallization of the colloidal sol by hydrothermal synthesis.

That is, alumina crystals are obtained by transferring the colloidal sol discharged through the continuous-flow mixer to a hydrothermal synthesis reactor and performing a hydrothermal synthesis at a temperature from 90° C. to 150° C. for 2 hours to 120 hours. A stirrer is attached to the hydrothermal synthesis reactor, and the system is continuously stirred at a stirring speed from 60 rpm to 600 rpm during the crystallization.

When the hydrothermal synthesis reaction is completed, porous alumina particles are dispersed by cooling the temperature of the reactant to normal temperature, and then adding an acid such as acetic acid thereto to adjust the pH to 6.0 to 8.0. Furthermore, a solid is obtained by filtering a reactant in which porous alumina particles are dispersed, and a porous alumina powder is obtained by washing the filtered solid several times with water, and then spray drying the solid.

The porous alumina powder obtained by the performing the aforementioned preparation method is a fine powder having a uniform particle diameter in a range from 10 nm to 30 nm in diameter, and has a specific surface area in a range from 100 $m^2/g$ to 200 $m^2/g$ and a pore volume in a range from 1.0 ml/g to 1.4 ml/g. Furthermore, it was confirmed through XRD that the porous alumina powder had a boehmite or pseudoboehmite structure.

The present invention as described above will be described in more detail with reference to the following Examples, but the present invention is not limited thereto.

EXAMPLES

Preparation of Porous Alumina

Example 1

Preparation of Porous Alumina Using Continuous-Flow Mixer

Figure 2:
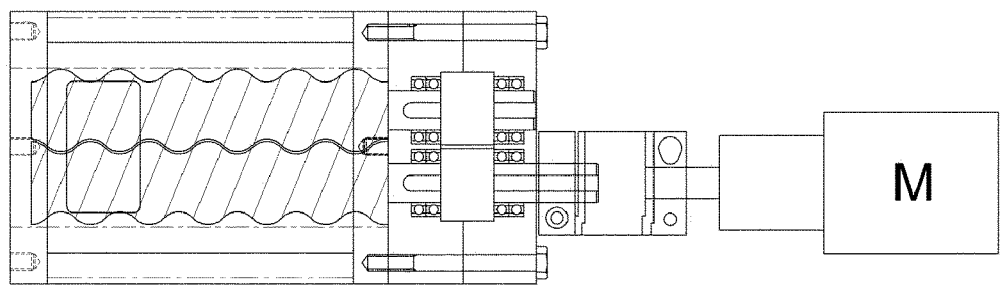
FIG. 2 is a plan view of a kneader-type continuous-flow mixer.
Figure 3:
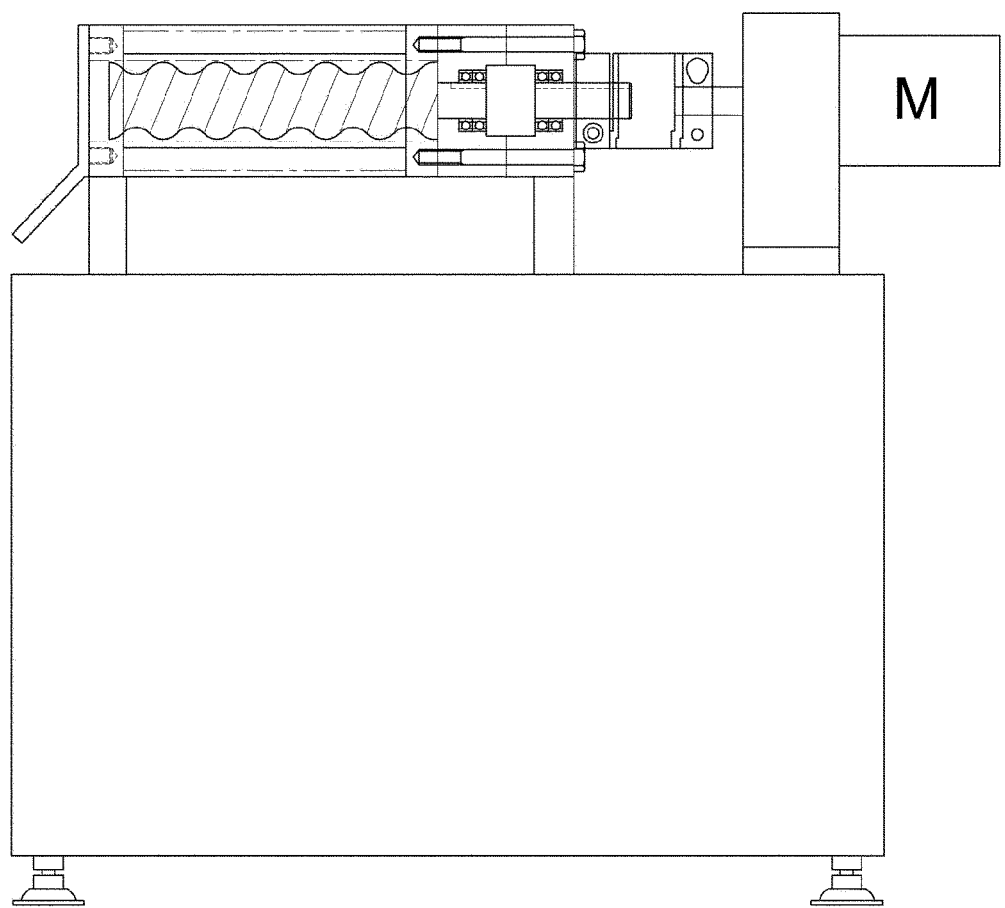
FIG. 3 is a front view of a kneader-type continuous-flow mixer.

The schematic view of the continuous-flow mixer used in the present Example is attached as FIGS. 2 and 3, and FIG. 2 is a plan view of the continuous-flow mixer and FIG. 3 is a front view of the continuous-flow mixer.

The process of preparing a porous alumina using a continuous-flow mixer is as follows.

First, 10.05 kg of a sodium aluminate solution having a concentration of 22.0 wt % was prepared by adding 2.15 kg of a caustic soda aqueous solution having a concentration of 50 wt % and 5.80 kg of water to 2.10 kg of aluminum hydroxide and dissolving the mixture at 130° C. The sodium aluminate solution prepared is stored in a polyethylene container and maintained at a temperature of 60° C.

Furthermore, 10.05 kg of a nitric acid solution having a concentration of 17.85 wt % was prepared by adding 7.06 kg of water to 2.99 kg of a nitric acid solution having a concentration of 60 wt %. The nitric acid solution prepared is stored in a polyethylene container and maintained at a temperature of 60° C.

A gelation reaction is performed by simultaneously injecting the sodium aluminate solution and the nitric acid solution, which are prepared above, into a continuous-flow mixer through a metering pump while maintaining the temperature at 60° C. That is, the sodium aluminate solution and the nitric acid solution were simultaneously injected into the mixer while the flow rate of the sodium aluminate solution was maintained at 50 g/min and the flow rate of the nitric acid solution was maintained at 50 g/min, such that the pH of the reactant in which the gelation reaction occurs became 9.5. A double screw type kneader was mounted in the continuous-flow mixer used at this time, and the continuous-flow mixer had a length of 180 mm, a diameter of 42 mm, and a ratio of length:diameter of approximately 1:0.12. The hydrogel formed during the initial mixing process using the continuous-flow mixer had a viscosity of 12,500 cp.

The hydrogel was converted into a colloidal sol by allowing the hydrogel to reside in the continuous-flow mixer for approximately 10 seconds while maintaining the number of rotations per minute of the kneader at 150, and the colloidal sol was discharged through the lower end portion of the mixer. The colloidal sol discharged through the lower end portion of the mixer had a viscosity of 960 Cp.

The colloidal sol prepared in the above was introduced into a hydrothermal synthesis reactor, and crystallized for 5 hours while being stirred under conditions of a temperature of 130° C. and the number of rotation per minute of 250 rpm.

When the crystallization was completed, the reactant was cooled to normal temperature, and then porous alumina particles were uniformly dispersed by adding 824 mL of an acetic acid solution thereto to adjust the pH of the reactant to 7.0. A solid was obtained by filtering the dispersion to separate and remove residual salt components, and a porous alumina powder was obtained by adding desalted water to the filtered solid in a 50-fold higher volume than the volume of the filtered solid to wash the filtered solid and spray drying the solid.

Physical properties of the porous alumina prepared by the aforementioned method were measured, and are shown in the following Table 1.

Example 2

Preparation of Porous Alumina Using Continuous-Flow Mixer 10.05 kg of a sodium aluminate solution having a concentration of 17.8 wt % was prepared by adding 1.75 kg of a caustic soda aqueous solution having a concentration of 50 wt % and 6.59 kg of water to 1.71 kg of aluminum hydroxide and dissolving the mixture at 130° C. The sodium aluminate solution prepared is stored in a polyethylene container and maintained at a temperature of 60° C.

10.05 kg of a polyaluminumchloride solution having a concentration of 8.49 wt % was prepared by adding 7.68 kg of $H_2O$ to 2.37 kg of a polyaluminumchloride (PAC) solution (KG Chemical Co., Ltd., Hi-Pax) having a concentration of 36 wt %. The PAC solution prepared is stored in a polyethylene container and maintained at a temperature of 60° C.

The following gelation, solation, crystallization and crystal collecting processes were performed in the same manner as in Example 1. Furthermore, physical properties of the porous alumina prepared were measured, and are shown in the following Table 1.

Comparative Example 1

Preparation of Porous Alumina Using Batch Type Mixer

The hydrogelation was performed by using 10.05 kg of the sodium aluminate solution having a concentration of 22.0 wt % and 10.05 kg of the nitric acid solution having a concentration of 17.85 wt %, which were prepared in Example 1, but a batch type mixer was used instead of a continuous-flow mixer.

The following solation, crystallization and crystal collecting processes were performed in the same manner as in Example 1. Furthermore, physical properties of the porous alumina prepared were measured, and are shown in the following Table 1.

Comparative Example 2

Preparation of Porous Alumina Using Batch Type Mixer

The hydrogelation was performed by using 10.05 kg of the sodium aluminate solution having a concentration of 17.8 wt % and 10.05 kg of the polyaluminumchloride solution having a concentration of 8.49 wt %, which were prepared in Example 2, but a batch type mixer was used instead of a continuous-flow mixer.

The following solation, crystallization and crystal collecting processes were performed in the same manner as in Example 1. Furthermore, physical properties of the porous alumina prepared were measured, and are shown in the following Table 1.

The following Table 1 compares the results of preparing the porous alumina using the continuous-flow mixer in Examples 1 and 2 and the batch type mixer in Comparative Examples 1 and 2.

TABLE 1

| Classification | pH | Viscosity (cp) | | Porous alumina | | | |
| | | Hydrogel | Colloidal sol | Specific surface area ($m^2/g$) | Pore volume (ml/g) | Average diameter (nm) | Crystal structure |
| --- | --- | --- | --- | --- | --- | --- | --- |
| Example 1 ($HNO_3$ + $NaAlO_2$) | 9.5 | 12,500 | 960 | 158 | 1.38 | 21 | Boehmite |
| Example 2 (PAC + $NaAlO_2$) | 9.5 | 13,800 | 1,050 | 154 | 1.38 | 23 | Boehmite |

TABLE 1-continued

| | | Viscosity (cp) | | Porous alumina | | | |
|---|---|---|---|---|---|---|---|
| Classification | pH | Hydrogel | Colloidal sol | Specific surface area (m²/g) | Pore volume (ml/g) | Average diameter (nm) | Crystal structure |
| Comparative Example 1 (HNO₃ + NaAlO₂) | 9.5 | 35,300 | 2,500 | 168 | 0.62 | 53 | Boehmite |
| Comparative Example 2 (PAC + NaAlO₂) | 9.5 | 43,200 | 2,930 | 163 | 0.69 | 62 | Boehmite |

According to Table 1, it was possible to prepare a porous alumina having a large pore volume of 1.0 mL/g or more in Examples 1 and 2 in which a continuous-flow mixer was used during the process of forming a hydrogel. On the contrary, an alumina having a small pore volume of 0.7 mL/g or less was prepared in Comparative Examples 1 and 2 in which a batch type mixer was used.

Example 3

Preparation of Porous Alumina Using Continuous-Flow Mixer

A sodium aluminate solution and a nitric acid solution were used as raw materials in the same manner as in Example 1, and the hydrogelation and colloidal sol conversion processes were continuously performed using a continuous-flow mixer as a mixer. However, a hydrogel was formed under conditions of a pH of 9.5, and then a residence time of the hydrogel in the mixer was changed while subjecting the hydrogel to torque by adjusting the number of rotations per minute of a kneader from 10 to 600.

The following crystallization and crystal collecting processes were performed in the same manner as in Example 1. Furthermore, physical properties of the porous alumina prepared were measured, and are shown in the following Table 2.

TABLE 2

| | | Viscosity (cp) | | Porous alumina | | |
|---|---|---|---|---|---|---|
| Classification | Residence time (sec) | Hydrogel | Colloidal sol | Specific surface area (m²/g) | Pore volume (ml/g) | Average diameter (nm) |
| Example 3 (HNO₃ + NaAlO₂) | 1 | 650 | 82 | 256 | 0.63 | 53 |
| | 5 | 6,500 | 300 | 169 | 1.13 | 23 |
| | 10 | 12,500 | 960 | 158 | 1.38 | 21 |
| | 20 | 18,200 | 1,800 | 162 | 1.15 | 25 |
| | 30 | 75,300 | 16,900 | 195 | 0.72 | 72 |

According to Table 2, when the residence time was maintained at 5 seconds to 20 seconds, it was possible to prepare a colloidal sol that maintains a viscosity from 300 cp to 1,800 cp, and the porous alumina finally prepared was obtained as a powder having a uniform particle diameter.

On the contrary, when the residence time was short as 1 second, a target porous alumina showed a significantly reduced yield and was disadvantageous due to low productivity because a hydrogel was discharged before uniform mixing was achieved, and an alumina which had a boehmite structure having a non-uniform particle size was produced. Further, when the residence time is maintained for a long time, for example, exceeding 20 seconds, a sharp increase in viscosity was caused, the flow of the product was not facilitated due to the sharp increase in viscosity and a phenomenon in which the exit was clogged occurred, and as a result, it was not possible to perform the continuous reaction any more.

Example 4

Preparation of Porous Alumina Using Continuous-Flow Mixer

A sodium aluminate solution and a nitric acid solution were used as raw materials in the same manner as in Example 1, and the hydrogelation and colloidal sol conversion processes were continuously performed using a continuous-flow mixer as a mixer.

Furthermore, the colloidal sol discharged from the mixer was introduced into a hydrothermal synthesis reactor, and crystallization was performed while stirring the reactor under a temperature condition of 90° C. After 24 hours, 48 hours, 72 hours, 96 hours and 120 hours from the time point when the crystallization was started, it was confirmed whether the crystallization was achieved by collecting 100 ml of a slurry, respectively.

A porous alumina having a boehmite structure was prepared by performing the following crystal collecting process in the same manner as in Example 1. Furthermore, physical properties of the porous alumina prepared were measured, and are shown in the following Table 3.

Example 5

Preparation of Porous Alumina Using Continuous-Flow Mixer

A sodium aluminate solution and a nitric acid solution were used as raw materials in the same manner as in Example 1, and the hydrogelation and colloidal sol conversion processes were continuously performed using a continuous-flow mixer as a mixer.

Furthermore, the colloidal sol discharged from the mixer was introduced into a hydrothermal synthesis reactor, and crystallization was performed while stirring the reactor under a temperature condition of 130° C. After 2 hours, 3 hours, 4 hours, 5 hours and 6 hours from the time point when the crystallization was started, it was confirmed whether the crystallization was achieved by collecting 100 ml of a slurry, respectively.

A porous alumina having a boehmite structure was prepared by performing the following crystal collecting process in the same manner as in Example 1. Furthermore, physical properties of the porous alumina prepared were measured, and are shown in the following Table 3.

Example 6

Preparation of Porous Alumina Using Continuous-Flow Mixer

A sodium aluminate solution and a nitric acid solution were used as raw materials in the same manner as in Example 1, and the hydrogelation and colloidal sol conversion processes were continuously performed using a continuous-flow mixer as a mixer.

Furthermore, the colloidal sol discharged from the mixer was introduced into a hydrothermal synthesis reactor, and crystallization was performed while stirring the reactor under a temperature condition of 150° C. After 2 hours, 3 hours, 4 hours, 5 hours and 6 hours from the time point when the crystallization was started, it was confirmed whether the crystallization was achieved by collecting 100 ml of a slurry, respectively.

A porous alumina having a boehmite structure was prepared by performing the following crystal collecting process in the same manner as in Example 1. Furthermore, physical properties of the porous alumina prepared were measured, and are shown in the following Table 3.

TABLE 3

| | Crystallization conditions | | Porous alumina | |
|---|---|---|---|---|
| Classification | Temperature (° C.) | Time (hr) | Specific surface area (m²/g) | Pore volume (ml/g) |
| Example 4 ($HNO_3$ + $NaAlO_2$) | 90 | 24 | 237 | 0.62 |
| | | 48 | 201 | 0.75 |
| | | 72 | 177 | 0.82 |
| | | 96 | 165 | 0.94 |
| | | 120 | 152 | 0.89 |
| Example 5 ($HNO_3$ + $NaAlO_2$) | 130 | 2 | 184 | 1.02 |
| | | 3 | 168 | 1.12 |
| | | 4 | 162 | 1.20 |
| | | 5 | 158 | 1.38 |
| | | 6 | 156 | 1.36 |
| Example 6 ($HNO_3$ + $NaAlO_2$) | 150 | 2 | 153 | 1.05 |
| | | 3 | 138 | 1.29 |
| | | 4 | 112 | 0.96 |
| | | 5 | 108 | 0.91 |
| | | 6 | 101 | 0.85 |

According to Table 3, when the crystallization was performed at a temperature of 90° C., there was a tendency that a specific surface area was decreased and a pore volume was increased as the crystallization time was increased, but a result of showing a large pore volume of 1.0 ml/g or more was not obtained. That is, since a long time is required in order to obtain a target porous alumina having a large pore volume by performing crystallization under relatively low temperature conditions of 90° C., Example 4 implies that there are problems of a reduction in productivity and an increase in process costs due to a long process time and requirements for a lot of crystallization reactors, and as a result, it was possible to confirm that a low crystallization temperature less than 90° C. was not preferred.

Further, when crystallization was performed at a temperature of 130° C., there was a tendency that the specific surface area was decreased and the pore volume was increased as the time for crystallization was increased, and when the crystallization was performed for 5 hours, the pore volume exhibited the maximum value and since then, the pore volume was also decreased. That is, in Example 5, there was an effect in that the process time was reduced by increasing the crystallization temperature to 130° C.

In addition, when the crystallization was performed at a relatively high temperature of 150° C. for 3 hours, the pore volume exhibited the maximum value and since then, the pore volume was also decreased. That is, since Example 6 implies that by maintaining the crystallization temperature in a high level up to 150° C., the crystallization reaction was so fast that the pore volume was rather decreased, it was possible to confirm that a high crystallization temperature exceeding 150° C. was not preferred.

[Reference Example]

Alumina slurries having a solid content of 1% were prepared by taking 1 g of porous alumina prepared by the methods in Example 1 (continuous flow mixing) and Comparative Example 1 (batch type mixing) and dispersing the porous alumina in 99 g of distilled water.

Figure 4:
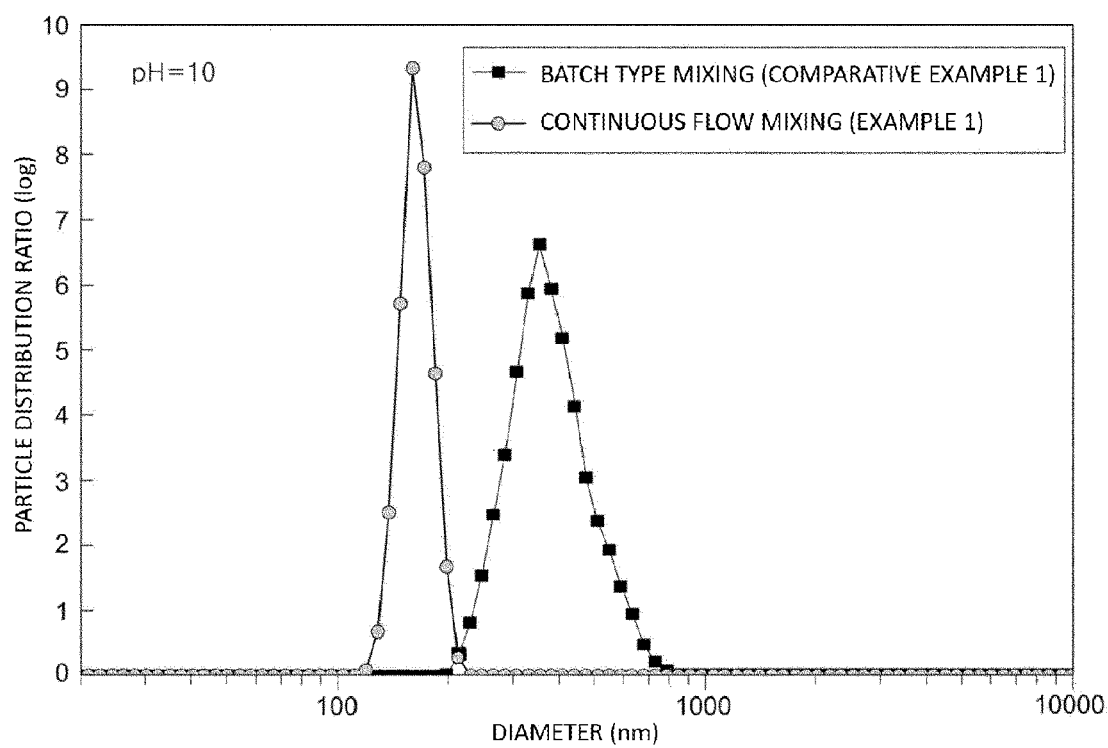
FIG. 4 is a graph showing the comparison of the particle size distributions of a porous alumina prepared by a continuous-flow mixing method and a batch-type method.

A result obtained by comparing a particle size distribution of each of the alumina slurries prepared above is shown in the graph of FIG. 4. As confirmed in the graph of FIG. 4, it can be seen that the alumina in Comparative Example 1 in which a batch type mixer was used exhibited a wide particle size distribution from 230 nm to 720 nm, whereas in the alumina in Example 1 in which a continuous-flow mixer was used, the cumulative ratio of a crystal having a narrow particle size distribution from 133 nm to 176 nm was 90% or more.

Figure 5:
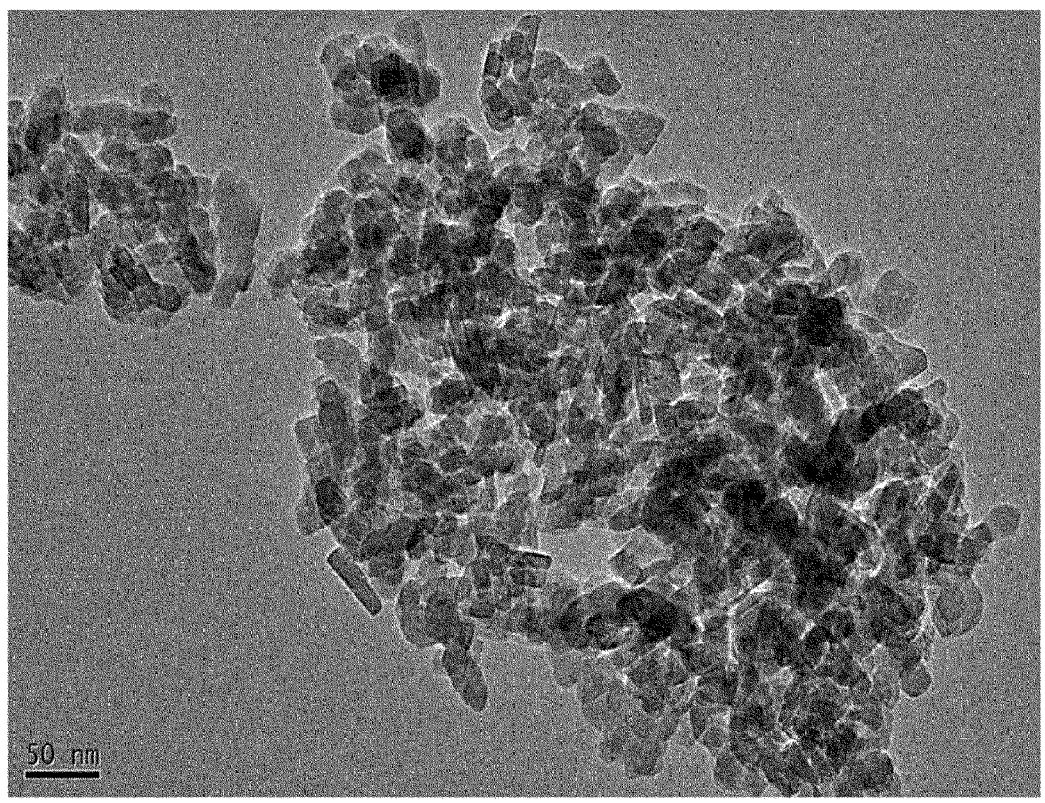
FIG. 5 is a transmission electron microscope photograph of a porous alumina prepared by a continuous-flow mixing method.

Furthermore, in FIG. 5, it can be seen through a transmission electron microscope photography that the porous alumina prepared in Example 1 was fine particles having a uniform particle size.

The invention claimed is:
1. A method for preparing a porous alumina, comprising:
  simultaneously injecting a sodium aluminate solution and a nitric acid or polyaluminumchloride solution into a continuous-flow mixer using a metering pump while maintaining a constant temperature in a temperature range from to 95° C., and forming a hydrogel while the pH of the mixed solution in the mixer is neutralized from 9 to 10 by bringing the sodium aluminate solution in contact with the nitric acid or polyaluminumchloride solution in the mixer;
  converting the hydrogel formed in the mixer into a colloidal sol by allowing the hydrogel to reside in the mixer for 5 seconds to 20 seconds while subjecting the hydrogel to torque; and
  preparing a porous alumina having a boehmite or pseudo-boehmite structure by introducing the colloidal sol into a hydrothermal synthesis reactor and crystallizing the colloidal sol at a temperature from 90° C. to 150° C.

2. The method of claim 1, wherein a viscosity of the hydrogel is maintained in a range from 6,500 cp to 18,200 cp.

3. The method of claim 1, wherein a viscosity of the colloidal sol is maintained in a range from 300 cp to 1,800 cp.

4. The method of claim 1, wherein the pH in the mixer is determined by flow rates of the sodium aluminate solution and the nitric acid or polyaluminumchloride solution.

5. The method of claim 1, wherein a concentration of each of the sodium aluminate solution and the nitric acid solution is in a range from 10 wt % to 30 wt %, and a concentration of the polyaluminumchloride solution is 5 wt % to 20 wt %.

6. The method of claim 1, wherein the continuous-flow mixer has a ratio of length:diameter of 1:0.02 to 0.35, and is equipped with a double screw kneader which has a number of rotations per minute in a range from 10 to 600.

7. The method of claim 1, wherein the crystal prepared has a boehmite or pseudoboehmite structure having an average diameter from 10 nm to 30 nm.

8. The method of claim 1, wherein when measurement is performed by preparing the crystal prepared as a slurry having a solid content of 1 wt %, crystals having a particle size distribution in a range from 133 nm to 176 nm have a cumulative ratio of 90% or more.

* * * * *